Patent Number: 4,788,260
Date of Patent: * Nov. 29, 1988

[54] WATER-DISPERSIBLE BINDERS FOR CATIONIC ELECTROPAINTS, AND A PROCESS FOR THEIR PREPARATION

[75] Inventors: Wolfgang Batzill, Münster; Horst Diefenbach, Nottuln; Michael Geist, Münster; Eberhard Schupp, Schwetzingen, all of Fed. Rep. of Germany

[73] Assignee: BASF Lacke & Farben AG, Muenster, Fed. Rep. of Germany

[*] Notice: The portion of the term of this patent subsequent to Mar. 13, 2001 has been disclaimed.

[21] Appl. No.: 471,738

[22] Filed: Mar. 3, 1983

[30] Foreign Application Priority Data

Mar. 20, 1982 [DE] Fed. Rep. of Germany ....... 3210307

[51] Int. Cl.[4] .................. C08F 283/04; C08G 59/14; C08L 63/00
[52] U.S. Cl. .................................. 525/423; 525/528; 525/530; 525/538; 525/454; 528/98; 528/99; 528/110; 528/112; 528/113
[58] Field of Search .................. 528/98, 99, 110, 112, 528/113; 525/423, 528, 530, 538, 454

[56] References Cited

U.S. PATENT DOCUMENTS

| 3,839,252 | 10/1974 | Bosso et al. | 528/219 |
|---|---|---|---|
| 4,134,864 | 1/1979 | Belanger | 528/112 |
| 4,148,772 | 4/1979 | Marchetti et al. | 523/415 |
| 4,248,753 | 2/1981 | Buchwalter et al. | 528/112 |
| 4,340,714 | 7/1982 | Schupp et al. | 528/104 |

FOREIGN PATENT DOCUMENTS 2701002  7/1977  Fed. Rep. of Germany.

Primary Examiner—Kriellion Morgan
Attorney, Agent, or Firm—Gilbert L. Wells

[57] ABSTRACT

The invention relates to water-dispersible binders which are intended for cationic electropaints and are based on reaction products which are formed from modified epoxy resins and primary and/or secondary amines and which can, if desired, also contain crosslinking agents, pigments, flow-control agents and other customary auxiliaries. They contain as reaction products those which have been prepared by reacting (A) low molecular weight epoxy resins which contain epoxy compound aromatic groups and have an epoxide equivalent weight of less than 375 with (B) aliphatic and/or alicyclic polyfunctional alcohols having hydroxyl groups or carboxylic acids having carboxylic groups and both having a molecular weight of less than 350 and addition of the hydroxyl groups and carboxylic groups to the epoxy groups of (A) in such a way that the reaction products of (A) and (B) contain 10–45% of aromatic groups, calculated as the phenylene group, and have terminal epoxy groups.

(C) reacting the terminal epoxy groups of the reaction products of (A) and (B), and thus chain-lengthening, with the phenolic hydroxyl groups of a mononuclear or polynuclear phenol which has at least two phenolic hydroxyl groups and at east one α,β-olefinically unsaturated amidomethyl group of the following general formula

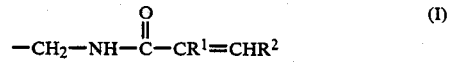

as a substituent on the aromatic rings(s) and in which $R^1$ and $R^2$ are identical to or different from one another and represent hydrogen or a methyl group, and (D) reacting the intermediate procuct obtained from (A), (B) and (C) with a primary or secondary amine or an ammonium salt.

29 Claims, No Drawings

WATER-DISPERSIBLE BINDERS FOR CATIONIC ELECTROPAINTS, AND A PROCESS FOR THEIR PREPARATION

The present application is a division of application Ser. No. 471,739, filed Mar. 3, 1983, 1 now U.S. Pat. No. 4,436,878.

The invention relates to water-dispersible binders which are intended for cationic electropaints and are based on reaction products which are formed from modified epoxy resins with primary and/or secondary amines and ammonium salts which can, if desired, also contain crosslinking agents, pigments, flow-control agents and other customary auxiliaries.

Cationic water-dispersible synthetic resins are known for use as binders for electropaints. For instance, German Offenlegungsschrifz No. 2,701,002 describes such a resin which is a reaction product of a polyepoxide which has a molecular weight of az least 350, a secondary amine and an organic polyol having at least two alcoholic primary hydroxyl groups. The resins are formed by chain-lengthening high molecular weight polyepoxides which have at least 2 epoxy groups per molecule. The chain-lengthening is achieved by means of an oragnic polyol, and the water-dispersibility is obtained by adduct formation with a secondary amine.

This and other known synthletic resins for cathodic electrocoating are frequently used as primer, i.e. articles coated with them received an additional, top coat of paint. However, it is a disadvantage that only relatively thin coatings can be obtained with existing resins. For instance German Offenlegungsschrift No. 2,701,002 mentions achievable layers which are only 11.4–18 μm thick. If a coating is subjected to particularly high requirements in respect of corrosion resistance and surface quality, as is the case, for example, with coatings on automotive vehicles and other high-value goods, it has therefore hitherto been customary to apply an additional layer between the electroprimer and the top coat, namely a so-called filler. This is involved and expensive. It is therefore desirable to improve the electrocoating method in such a way that thicker layers can be obtained with this process. As already mentioned above, this is however impossible with existing cationic synthetic resins. The problems arise due to the fact that increasing the deposition voltage to above the breakdown voltage causes surface defects in the film due to the fact that the layer cracks open. Extending the coating time also produces an increase in the film thickness, but this increase cannot be continued for as long as desired, since the electrical resistance of the deposited film normally defines an upper limit to the film thickness at which there is virtually no further increase in film thickness however long the coating period.

According to U.S. patent application Ser. No. 432,960, filed Sept. 27, 1982 it is now possible to obtain relatively thick films in electrocoating when binders are used which are based on modified epoxy resins and which contain aromatic and aliphatic or alicyclic groups in certain ratios. The binders according to the main patent are composed of epoxy resins, polyfunctional alcohols and a solubilising component.

It has now been found that improved binders are obtained when the polyfunctional alcohols used in their preparation are mononucular or polynuclear phenols which have at least two phenolic hydroxyl groups and at least one α,β-olefinically unsaturated amidomethyl group as a substituent on the aromatic ring(s).

The invention therefore relates to binders of the type mentioned in the introduction which contain reaction products which have been obtained by reacting (A) low molecular weight epoxy resins which contain epoxy groups and aromatic groups and have an epoxide equivalent weight of less than 375 with (B) aliphazic and/or alicyclic polyfunctional alcohols having hydroxyl groups alcohols or carboxylic acids having carboxylic groups and both having a molecular weight of less than 350 and addition of the hydroxyl groups and carboxylic groups to the epoxy groups of (A) in such a way that the reaction products of (A) and (B) contain 10–45% of aromatic groups, calculated as the phenylene group, and have terminal epoxy groups.

(C) reacting the terminal epoxy groups of the reactive products of (A) and (B), and thus chain-lengthening, with the phenolic hydroxyl groups of a mononuclear or polynuclear phenol which has at least two phenolic hydroxyl groups and at least one α,β-olefinically unsaturated amidomethyl group of the following general formula

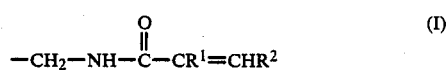

as a substituent on the aromatic ring(s) and in which $R^1$ and $R^2$ are identical to or different from one another and represent hydrogen or a methyl group, and (D) reacting the intermediate product obtained from (A), (B) and (C) with a primary or secondary amine or an ammonium salt.

It is advantageous if the intermediate product formed from (A) and (B) with (C) has been reacted in such a molar ratio that the resulting reaction product has terminal epoxy groups and that the amine or ammonium salt (D) has been added on to these epoxy groups.

In another advantageous embodiment of the invention, epoxy groups, if present on the reaction product of (A), (B) and (C) have been opened up by reacting them, and the amine (D) has been added to some of the double bonds which stemmed from component (C).

The epoxy groups are advantageously opened up by reacting them with a carboxylic acid, an alcohol, a thio alcohol or a phenol.

Suitable for use as component A—low molecular weighs epoxy resins which contain aromatic groups and have an epoxide equivalent weight of less than 375—are polyepoxides. For the purposes of the present invention polyepoxides are materials which contain two or more epoxy groups in the molecule. Preferred compounds have two epoxy groups in the molecule. The polyepoxides have a relatively low molecular weight of at most 750, preferably 400–500. The polyepoxides can be, for example, polyglycidyl ethers of polyphenols, such as bisphenols, advantageously, for example, bisphenol A. These polyepoxides can be prepared by etherifying a polyphenol with an epihalohydrin in the presence of alkali. Examples of suitable phenol compounds are bis-(4-hydroxyphenyl)-2,2-propane, 4,4 -dihydroxybenzophenone, bis-(4-hydroxyphenyl)-1,1-ethane, bis-(4-hydroxyphenyl)-1,1-isobutane, bis-(4-hydroxy-tertiary-butylphenyl-2,2-propane, bis-(2-hydroxynaphthyl)-methane, 1,5-dihydroxynaphthalene and hydantoin epoxides.

Another suitable class of polyepoxides are polyglycidyl ethers of phenolic novolak resins.

It is also advantageous to use polyglycidyl esters of aromatic polycarboxylic acids.

The compounds used as component B are aliphatic and/or alicyclic polyfunctional alcohols or carboxylic acids having a molecular weight of less than 350. These advantageously have a branched aliphatic chain, in particular with at least one neo structure.

Suitable compounds have the following general formula:

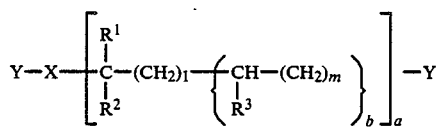

where Y=OH or COOH, X=(CH$_2$)$_n$

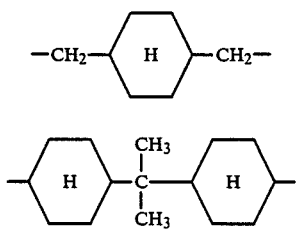

R$^1$, R$^2$ and R$^3$=H or an alkyl radical having 1 to 5 carbon atoms, a=0 or 1, b=0 or 1, l=0-10 and m,n=1-10.

Specific examples are diols, such as ethylene glcyol, diglycol, dipropylene glycol, dibutylene glycol, triglycol, 1,2-propanediol, 1,3-propanediol, 2,2-dimethyl-1,3-propanediol, 2,2-diethyl-1,3-propanediol, 2-methyl-2-ethyl-1,3-propanediol, 2-methyl-2-propyl-1,3-propanediol, 2-ethyl-2-butyl-1,3-propanediol, 1,2-butanediol, 1,4-butanediol, 2,3-butanediol, 2-ezhyl-1,4-butanediol, 2,2-diethyl-1,3-butanediol, but-2-ene-1,4-diol, 1,2-pentanediol, 1,5-pentanediol, 3-methyl-1,5-pentanediol, 1,6-hexanediol, 2,5-hexanediol, 2-ethyl-1,3-hexanediol, 2,5-dimethyl-2,5-hexanediol, 1,3-octanediol, 4,5-nonanediol, 2,10-decanediol, 2-hydroxyethyl hydroxyacetaze, 2,2-dimethyl-3-hydroxypropyl 2,2-dimethylhydroxypropionate, 2-methyl-2-propyl-3-hydroxypropyl 2-methyl-2-propylhydroxypropionate, 4,4'-methylenebiscyclohexanol and 4,4'-isopropylidenebiscyclohexanol. Some preferred diols are 2,2-dimethyl-1,3-propanediol, 3-methyl-1,5-pentanediol, 2,2-dimethyl-3-hydroxypropyl 2,2-dimethylhydroxypropionate and 4,4'-isopropylidenebiscyclohexanol.

There are a large number of dicarboxylic acids suitable for use as carboxylic acids, such as oxalic acid, malonic acid, 2,2-dimethylmalonic acid, succinic acid, glutaric acid, adipic acid, hexahydrophthalic acid, maleic acid, fumaric acid, pimelic acid, suberic acid, azelaic acid, sebacic acid, itaconic acid, citraconic acid, mesaconic acid or glutaconic acid.

Examples of dicarboxylic acids which are preferably used are 2,2-dimethylmalonic acid and hexahydrophthalic acid.

The essential point is that the compounds of component B are reacted with component A in such a ratio that the reaction product has the specified aromatic group content, calculated as the phenylene group, namely of 10–45%.

The reaction product of (A) and (B) is reacted with the phenolic hydroxyl groups of a mononuclear or polynuclear phenol which has at least two phenolic hydroxyl groups and at least one α,β-olefinically unsaturated amidoethyl group of the following general formula

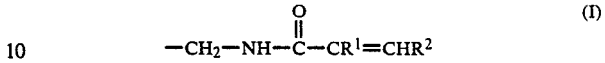

as a substituent on the aromatic ring(s) and in which R$^1$ and R$^2$ are identical to or different from one another, and represent hydrogen or a methyl group.

The following details refer to component (C) of binders according to the invention:

The monophenols and/or polyphenols which carry α,β-olefinically unsaturated amidomethyl groups are substituted on the aromatic nucleus by groups of the general formula

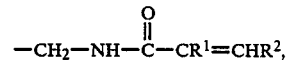

in which R$^1$ and R$^2$ denote identical or different radicals, and represent hydrogen or a methyl group. Those groups of the formula (I) are preferable where R$^1$ denotes hydrogen or a methyl group and R$^2$ denotes hydrogen. The monophenols and/or polyphenols carrying the αβ-unsaturated amidomethyl groups can be prepared from phenols or polyphenols and compounds of the formula

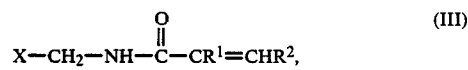

in which X represents OH, halogen, such as, for example, chlorine or an alkoxy group having 1 to 8, preferably 1 to 4, carbon atoms and R$^1$ and R$^2$ have the abovementioned meaning.

Suitable phenols are monophenols and/or polyphenols, especially diphenols of the general formula

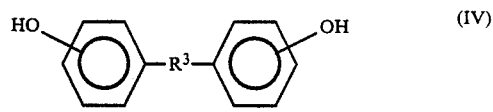

in which the OH groups are in the ortho- and/or para-position relative to R$^3$, and R$^3$ represents a straight chain or branched divalent aliphatic radical having 1 to 3 carbon atoms or represents —SO$_2$—, —SO—, —S—, —CO— or —O—; a particularly suitable diphenol is 2,2-bis-p-hydroxyphenylpropane (bisphenol A).

To set the molecular weight of binders according to the invention within the range desired, it can be advantageous to replace some of the diphenols by monophenols.

Examples of suitable monophenols are phenol, cresols, o- or p-tert.-butylphenol, Cardanol, and the like. Cardanol is a natural product and consists of a mixture of long-chain 2-alkylenephenols having about 13 to 17 carbon atoms in the alkylene moiety, for example 3-(8,11-pentadecadienyl)-phenol. These alkylene chains lead, on using Cardanol, to binders with which particularly resilient coatings can be prepared.

The phenols can be reacted with the compounds of the formula (III) within a wide temperature range, advantageously in the presence of solvents, such as toluene, xylene, isobutanol, ethylglycol, ethylhexanol or the like.

If strong acids, such as HCl, are used as catalysts it is possible to carry out the reaction at temperatures around 0° C., while weaker acidic catalysts may require temperatures of up to about 160° C.

It is also possible to prepare compounds of the formula (III) in situ and then to react them with the phenol concerned.

For instance, acrylamide, paraformaldehyde and 2,2-bis-p-hydroxyphenylpropane can be reacted in isobutanol with toluenesulphonic acid to give the corresponding diphenol which has an $\alpha,\beta$-olefinically unsaturated amidomethyl group. The presence of the small amounts of methylenebisacrylamide formed in this reaction is not troublesome, since under baking conditions they likewise contrbute to the crosslinking.

The reaction of phenols with compounds of the formula(III) involves elimination of HX and an amidomethylation at the aromatic nucleus of the phenol. Such reactions are known as Tscherniac-Einhorn reactions. U.S. Pat. No. 3,839,447 describes the reaction of 2,2-bis-p-hydroxyphenylpropane with N-methylolacrylamide in glacial acetic acid using HCl as catalyst. The resulting diphenols which carry $\alpha,\beta$-olefinically unsaturated amidomethyl groups can be used to prepare the polyaddition products according to the invention.

By using, for example, N-methylol fatty acid amides it is possible in a simple manner to add to the phenols groups which act in a flexibility-imparting manner.

It is possible to use 0.3 to 2.5 moles of compound of the formula (III) per equivalent of phenol (=phenolic OH group). However, in general, 0.5 to 1.5 moles per equivalent of phenol are adequate to ensure optimal crosslinking density in the finished paint film.

Component (C) advantageously is thus a mononuclear or binuclear phenol of the general formula

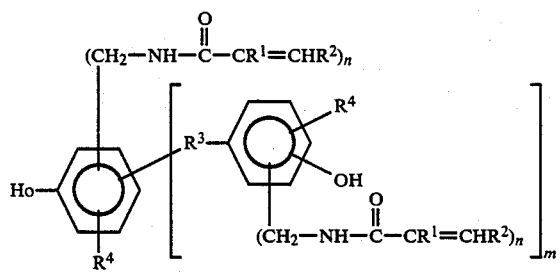

in which $R^1$ and $R^2$ are identical to or different from one another, and represent hydrogen or a methyl group, $R^3$ represents a straight-chain or branched divalent alkylene radical or represents —SO$_2$—, —SO—, —S—, —CO— or —O—, $R^4$ represents hydrogen, a hydroxyl group or an alkyl radical, n=1 to 3, and m=0 or 1.

In preparing binders according to the invention, the reaction product of (A), (B) and (C) is finally reacted with an amine or an ammonium salt to obtain dispersibility in water. There are in fact two possible methods of carrying out this introduction of solubilising groups. If the intermediate product of (A) and (B) has been reacted with (C) in such a molar ratio that the resulting reaction product has terminal epoxy groups, the amine or the ammonium salt can be added to these epoxy groups. The second possibility consists in adding a primary or secondary amine to the double bonds from component (C) in the manner of a Michael addition. In this case it is not necessary for the reaction product of (A), (B) and (C) to contain epoxy groups. If, nevertheless, they are present, they are advantageously opened up by reacting them with, for example, a carboxylic acid, an alcohol, a thio alcohol or a phenol, before adduct formation with the amines.

The amine used as component D in the first method of reacting with the epoxy groups can be primary, secondary or tertiary, but secondary amines are particularly highly suitable. Primary and secondary amines can be added directly to the epoxy ring, while tertiary amines can only be added in the form of their ammonium salts or via a further functional group in the molecule. The amine should preferably be a compound which is soluble in water. Examples of such amines are monoalkylamines and dialkylamines, such as methylamine, ethylamine, propylamine, butylamine, dimethylamine, diethylamine, dipropylamine, methylbutylamine and the like. Alkanolamines are also suitable, such as, for example, methylethanolamine, diethanolamine and the like. Furthermore, dialkylaminoalkylamines are suitable, such as, for example, dimethylaminoethylamine, diethylaminopropylamine and the like.

In most cases low molecular weight amines are used, but it is also possible to use monoamines which have a relatively high molecular weight, in particular when it is intended to increase the flexibility of the resin by incorporating such amines. Similarly it is also possible to use mixtures of low molecular weight and high molecular weight amines to modify resin properties.

Polyamines having primary and secondary amino groups can be reacted with the epoxy groups in the form of their ketimines. The ketimines are prepared from the polyamines in known manner.

The amines can also contain other groups, but these should not interfere with the reaction of the amine with the epoxy group, nor should they cause gelling of the reaction mixture.

In many cases the amine reacts with the epoxy-containing compound as soon as these materials are mixed with each other. However, in some cases it may be desirable to heat the mixture to moderately elevated temperatures, for example to 50° to 150° C., but reactions can also be carried out at lower and higher temperatures. In many cases it is advantageous to complete the reaction by raising the temperature toward the end of the reaction at least slightly for a period which is long enough to ensure complete conversion.

The amount of amine used for the reaction with the epoxy-containing compound should at least be such that the resin assumes cationic characteristics, i.e. that it migrates in the coating bath under the influence of a voltage to the cathode when it has been made soluble by adding an acid. It is possible to react virtually all the epoxy groups of the resin with an amine. However, it is also possible to leave excess epoxy groups in the resin, which will, on contact with water, hydrolyze and form hydroxyl groups.

It is also possible to use an ammonium salt in place of amines mentioned or together with these. The salt of a tertiary amine can be used as an ammonium salt. Acids which are suitable for neutralizing the amines and which can be used in the invention include boric acid or other acids which have a greater dissociation constant than boric acid has, preferably organic acids having a dissociation constant of greater than about $1 \times 10^5$. The preferred acid is lactic acid. Examples of other acids are formic acid, acetic acid, propionic acid, butyric acid, hydrochloric acid, phosphoric acid, sulfuric acid and carbonic acid.

The amine part of the ammonium salt is an amine which can be unsubstituted or substituted, as is the case with hydroxylamine, but these substituents should not nnterfere with the reaction of the ammonium salt with the polyepoxide and should not gel the reaction mixture. Preferred amines are tertiary amines, such as dimethylethanolamine, triethylamine, trimethylamine, triisopropylamine and the like. Examples of other suitable amines are given in U.S. Pat. No. 3,839,252, in line 3 of column 5 to line 42 of column 7.

The ammonium salt is obtained in a known manner by reacting the amine with the acid.

The temperature for reacting the ammonium salts with the polyepoxides can be varied between the lowest temperature at which the reaction proceeds at a significant rate, for example room temperature or, as a rule, somewhat higher than room temperature, and a maximum temperature between about 100° and 110° C. The reaction does not require a solvent, although one is frequently added to give better control of the reaction. Possible solvents are aromatic hydrocarbons or monoalkyl ethers of ethylene glycol.

The ratio between the ammonium salt and the epoxy compound can vary, optimum ratios depending on the specific starting materials. In general about 1 to about 50 parts by weight of salt can be used per 100 parts by weight of polyepoxide. In general the ratio is chosen as a function of the nitrogen content derived from the quaternising agent and which, typically, amounts to about 0.05 to about 16%, relative to the total weight of the ammonium salt and the polyepoxide.

The resins generally contain the entire nitrogen in the form of chemically bonded quaternary ammonium groups, although in some cases less than 100% of the nitrogen is present in the form of quaternary ammonium groups. An example of such a case exists when primary and seconary amines are used for preparing the resins containing quaternary ammonium groups. Such resins contain as a rule secondary and tertiary ammonium groups.

The specific starting materials, quantities and reaction conditions are chosen in agreement with well-known experiences in such a way tht gelling of the product is avoided during the reaction. For instance, excessively aggressive reaction conditions are not used. Similarly, nor are starting materials used which have reactive substituents which are capable of reacting with the epoxy compounds, since they have an adverse effect on the reaction.

The abovementioned amines insofar as they are primary or secondary amines are suitable for adding to the double bonds, secondary amines being preferred. The Michael addition can be carried out in a known manner below 120° C.

Binders according to the invention are self-crosslinking owing to their double bonds. However, an additional crosslinking agent which effects a further crosslinking reaction at elevated temperatures can advantageously be added to the electropaint, or this binder can be modified in such a way that it contains additional reactive groups which effect a self-crosslinking reaction at elevated temperatures. These groups can advantageously be introduced by reacting some of the hydroxyl groups of the binder with a partially blocked polyisocyanate which has on average one free isocyanate group per molecule and whose blocked isocyanate groups are stable at room temperature and become unblocked at elevated temperatures and react with the remaining hydroxyl groups of the binder to form a urethane.

Frequently used methods of crosslinking binders have been disclosed in, for example, the following patent publications: German Offenlegungsschrift No. 2,057,799, European patent application Nos. 12,463 and 4,090, and German Offenlegungsschrift No. 2,752,256.

If crosslinking agents are used, they as a rule constitute about 5 to about 60% by weight of the binder. They preferably amount to about 20 to about 40% by weight of the binder.

Examples of suitable aminoplast crosslinking agents are the hexamethyl ether of hexamethylolmelamine, the triethyl trimethyl ether of hexamethylolmelamine, the hexabutyl ether of hexamethylolmelamine and the hexamethyl ether of hexamethylolmelamine and polymeric butylated melamine/formaldehyde resins.

Urea/aldehyde crosslinking agents can be prepared in a known manner by reacting urea and an aldehyde to the resol stage, and alkylating the reaction product with an alcohol under acidic conditions, which produces an alkylated urea/aldehyde resin. An example of a suitable crosslinking agent based on a urea/aldehyde resin is a butylated urea/formaldehyde resin.

It is also possible to use blocked polyisocyanates as crosslinking agents. For the purposes of the invention any desired polyisocyanate can be used where the isocyanate groups have been reacted with a compound, so that the blocked polyisocyanate formed is stable to hydroxyl groups at room temperature but reacts with them at elevated temperatures, as a rule within the range from about 90° to about 200° C. The blocked polyisocyanate can be prepared from any desired organic polyisocyanate which is suitable for crosslinking. Those isocyanates are preferred which contain about 3 to about 36, in particular about 8 to about 15, carbon atoms. Examples of suitable diisocyanates are trimethylene diisocyanate, tetramethylene diisocyanate, pentamethylene diisocyanate, hexamethylene diisocyanate, propylene diisocyanaze, ethylezhylene diisocyanaze, 2,3-dimethylethylene diisocyanate, 1-methyltrimethylene diisocyanate, 1,3-cyclopentylene diisocyanate, 1,4-cyclohexylene diisocyanate, 1,2-cyclohexylene diisocyanate, 1,3-phenylene diisocyanate, 1,4-phenylene diisocyanate, 2,4-toluylene diisocyanate, 2,6-toluylene diisocyanate, 4,4'-biphenylene diisocyanaze, 1,5-naphthylene diisocyanate, 1,4-naphthylene diisocyanate, 1-isocyanatomethyl-5-isocyanato-1,3,3-trimethylcyclohexane, bis-(4-isocyanatocyclohexyl-methane, bis-(4-isocyanatophenyl)-methane, 4,4'-diisocyanatodiphenyl ether and 2,3-bis-(8-isocyanatooctyl)-4-octyl-5-mexyl-cyclohexane. It is also possible to use polyisocyanates of higher isocyanate functionality. Examples of such polyisocyanates are tris-(4-isocyanatophenyl)methane, 1,3,5-trisisocyanatobenzene, 2,4,6-triisocyanatotoluene, 1,3,5-tris-(6-isocyanatohexyl)biuret, bis-(2,5-diisocyanato-4-methylphenyl)methane and polymeric polyisocyanates, such as dimers and trimers of diisocyanatoluene. Further, it is also possible to use mixtures of polyisocyanates.

Organic polyisocyanates which, for the purposes of the invention, are suitable for use as crosslinking agents can even be prepolymers which are derived, for example, from a polyol, including a polyether-polyol, or from a polyester-polyol. In this derivation reaction as is known polyols are reacted with an excess of polyisocyanates, thereby forming prepolymers having terminal isocyanate groups. Examples of polyols which can be used for this purpose are simple polyols, such as glycols, for example ethylene glycol and propylene glycol, or other polyols, such as glycerol, trimethylolpropane, hexanetriol and pentaerythritol; also monoethers, such as diethylene glycol and tripropylene glycol, and polyethers which are condensates of such polyols with alkylene oxides. Examples of alkylene oxides which are suitable for being condensed with these polyols to give polyethers are ethylene oxide, propylene oxide, butylene oxide and styrene oxide. These condensates are generally referred to as polyethers having terminal hydroxyl groups. They can be linear or branched. Examples of such polyethers are polyoxyethylene glycol having a molecular weight of 1,540, polyoxypropylene glycol having a molecular weight of 1,025, polyoxytetramethylene glycol, polyoxyhexamethylene glycol, polyoxynonamethylene glycol, polyoxydecamethylene glycol, polyoxydodecamethylene glycol and mixtures thereof. It is also possible to use other types of polyoxyalkylene glycol ether. Those polyether-polyols are particularly suitable which are obtained by reacting such polyols, namely, for example, ethylene glycol, diethylene glycol, triethylene glycol, 1,4-butanediol, 1,3-butanediol, 1,6-hexanediol and mixtures thereof, glyceroltrimethylolethane, trimethylolpropane, 1,2,6-hexanetriol, pentaerythritol, dipentaerythritol, tripentaerythritol, polypentaerythritol, methylglucosides and sucrose, with alkylenes, such as ethylene oxide, propylene oxide or mixtures thereof.

Any desired suitable aliphatic, cycloaliphatic or aromatic alkyl monoalcohol can be used for blocking the polyisocyanate. Examples thereof are aliphatic alcohols, such as methyl, ethyl, chloroethyl, propyl, butyl, amyl, hexyl, heptyl, octyl, nonyl, 3,3,5-trimethylhexyl, decyl and lauryl alcohol, cycloaliphatic alcohols, such as cyclopentanol and cyclohexanol, and aromatic alkyl alcohols, such as phenylcarbinol and methylphenylcarbinol. It is also possible, if desired, to use small amounts of high molecular weight and relatively involatile monoalcohols, which, afzer they have been split off, act as plasticizers in the coatings.

Other suitable blocking agents are hydroxylamines, such as ethanolamine, and oximes, such as ethyl methyl ketonoxime, acetonoxime and cyclohexanonoxime.

The blocked polyisocyanates are prepared by reacting such an amount of an alcohol with the organic polyisocyanate that there are no free isocyanate groups left over. The reaction between the organic polyisocyanate and the blocking agent is exothermic. This is why the polyisocyanate and the blocking agent are preferably mixed at a temperature which is not higher than 80° C., in particular which is less than 50° C., to counteract the exothermic effect.

The polyisocyanates and blocking agents mentioned can in suitable ratios also be used for preparing the partially blocked polyisocyanates described above.

The invention also relates to a process for preparing the binders, which comprises reacting (A) low molecular weight epoxy resins which contain epoxy groups and aromatic groups and have an epoxide equivalent weight of less than 375 with (B) aliphatic and/or alicyclic polyfunctional alchols having hydroxyl groups or carboxylic acids having carboxylic groups and both having a molecular weight of less than 350 and addition of the hydroxyl groups and carboxylic groups to the epoxy groups of (A) in such a way that the reaction products of (A) and (B) contain 10–45% of aromatic groups, calculated as the phenylene group, and have terminal epoxy groups.

(C) reacting the terminal epoxy groups of the reaction products of (A) and (B), and thus chain-lengthening, with the phenolic hydroxyl groups of a mononuclear or polynuclear phenol which has at least two phenolic hydroxyl groups and at least one α,β-olefinically unsaturated amidomethyl group of the following general formula

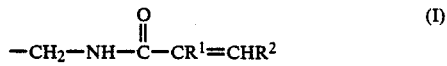

as a substituent on the aromatic ring(s) and in which $R^1$ and $R^2$ are identical to or different from one another and represent hydrogen or a methyl group, and (D) reacting the intermediate product obtained from (A), (B) and (C) with a primary or secondary amine or an ammonium salt.

The process is carried out as follows: component A and component B are mixed and completely reacted with each other at temperatures between 100° and 140° C., preferably 115° to 135° C., if desired in the presence of catalysts, such as, for example, tertiary amines. The reaction can be monitored by means of the epoxide equivalent weight. This reaction product of components A and B is further modified with component C at temperatures between 100° and 160° C. The resulting reaction product can still contain free epoxy group, depending on the molar ratios in which the components were used. This reaction step can be carried out using the same catalysts as in the reaction of components A and B. The resulting reaction product is reacted at temperatures between 60° and 120° C. with component D, so that a binder is formed which contains basic amino groups. In the latter reaction step component D is added either to the epoxy groups or, if no epoxy groups are present, to the double bonds from component (C). The basic reaction product can be completely or partially protonated by adding acids, and then be dispersed in water. The crosslinking agent can be admixed to the binder before the dispersal in water, or, depending on the reactivity, can be added during the preparation of the binder. In the case of partially blocked polyisocyanates these are reacted with the binder at temperatures between 80° and 150° C., preferably at temperatures between 100° and 130° C. The electropaints obtained are stable, easily handled dispersions. Where appropriate it can also be advantageous to dissolve the binders in suitable organic solvents before the dispersion is prepared. Examples of suitable solvents are glycol ethers, ethylglycol, butylglycol, ketones, such as diethylketone, methyl ethyl ketone, isobutyl methyl ketone, and the like.

The invention also relates to the use of the binders for electrocoating baths.

The electrocoating baths can contain customary pigments. A dispersant or a surface-active agent is frequently added to the pigments. The pigment and the surface-active agent used if desired are milled together with some of the binder or on their own, in order to prepare a paste which is diluted with the rest of the binder to prepare the coating composition.

In some cases it is advantageous to add to the electrocoating bath a nonionic modifier or solvent in order to improve the dispersibility, the viscosity and/or the quality of the film. Examples of such materials are aliphatic, naphthenic and aromatic hydrocarbons or mixtures thereof, monoalkyl and dialkyl ethers of glycols, Siberian pine needle oil and other solvents which are compatible with the resin system. The modifier preferred at present is 4-methoxy-4-methylpentan-2-one.

The electrocoating bath can also contain other additives, such as antioxidants. Examples thereof are ortho-amylphenol and cresol. The addition of such antioxidants is particularly desirable when the deposition baths are exposed to atmospheric oxygen for prolonged periods of stirring at elevated temperatures.

Other additives which the bath may contain are wetting agents, such as petroleumsulfonates, sulfated fatty amines or their amides, esters of sodium isothionates, alkylphenoxypolyethylene alkanols or phosphate esters, including ethoxylated alkylphenol phosphates. Other groups of possible additives are antifoams and suspending agents. Normal tap water can be used to make up the deposition bath. However, since such water contains relatively large amounts of salts, the electrical deposition process can thereby be modified in an undesirable manner. For this reason deionized water is generally preferred.

The possible additives listed above are not complete, since any other desired additive which does not interfere with the electrical deposition process can be used.

The invention also relates to a process for the electrophoretic coating of an electrically conductive substrate which is connected as the cathode, from an aqueous bath based on cationic binders which are at least partially neutralized with acids, which comprises the binders having been prepared by reacting (A) low molecurlar weight epoxy resins which contain epoxy aromatic groups and groups and have an epoxide equivalent weight of less than 375 with (B) aliphatic and/or alicyclic polyfunctional alcohols having hydroxyl groups or carboxylic acid having carboxylic groups and both having a molecular weight of less than 350 and addition of the hydroxyl groups and carboxylic groups of (A) the epoxy groups in such a way that the reaction products of (A) and (B) contain 10–45% of aromatic groups, calculated as the phenylene group, and have terminal epoxy groups.

(C) reacting the terminal epoxy groups of the reaction products of (A) and (B), and thus chain-lengthening, with the phenolic hydroxyl groups of a mononuclear or polynuclear phenol which has at least two phenolic hydroxyl groups and at least one α,β-olefinically unsaturated amidomethyl group of the following general formula

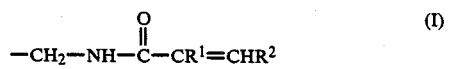
(I)

as a substituent on the aromatic ring(s) and in which $R^1$ and $R^2$ are identical to or different from one another and represent hydrogen or a methyl group, and (D) reacting the intermediate product obtained from (A), (B) and (C) with a primary or secondary amine or an ammonium salt.

The substrate on to which electrical deposition takes place can be any desired electrically conductive substrate. It is usually a metal substrate, such as, for example, iron, steel, copper, zinc, brass, tin, nickel, chromium or aluminum as well as other metals, pretreated metals and also phosphated or chromated metals. It is even possible to use impregnated paper or other conductive substrates.

In the cationic deposition process the articles to be coated are dipped into an aqueous dispersion of the solubilized film-forming cationic binder. An electric voltage is applied between the article to be coated, which serves as the cathode, and an anode, and the cationic binder is deposited on to the cathode by the electric current. The article is then removed from the bath and as a rule rinsed. The coating is then hardened in a customary manner by heating it.

In the examples which follow the invention is illustrated in more detail. All data concerning parts and percentages are by weight unless expressly stated otherwise.

INITIAL PRODUCT 1

500 parts of dihydroxydiphenyl sulphone and 606 parts of methylolacrylamide are dissolved at 50° C. in 456 parts of acetic acid, the solution is cooled down to 15° C., and HCl gas is passed in at this temperature until the solution is saturated. The mixture is then heated at 65° C. for 6 hours. The batch is then allowed to cool down to room temperature, when it is diluted with 2,000 parts of methylene chloride and extracted four times with 2,000 parts of water each time. To aid solubilization in the extraction with water a small amount of acetone is added. The final extraction is carried out with a solution of 100 parts of sodium carbonate in 2,000 parts of water, and the organic phase is dried over sodium sulphate. The solvent is removed at 80° C. in vacuo, leaving behind a viscous, virtually colorless mass.

INITIAL PRODUCT 2

The method of preparing initial product 1 is followed, except that 456 parts of 2,2-(4,4'-dihydroxydiphenyl)-propane are used in place of the 500 parts of dihydroxydiphenyl sulphone and the amount of methylolacrylamide is increased from 606 parts to 808 parts.

INITIAL PRODUCT 3

The method of preparing initial product 1 is followed, except that 400 parts of 4,4'-dihydroxydiphenylmethane are used in place of 500 parts of dihydroxyphenyl sulfone and the amount of methylolacrylamide is increased from 606 to 707 parts.

INITIAL PRODUCT 4

Preparation of a 1st crosslinking agent

A reactor which is equipped with a heater, a cooler, a stirrer, a thermometer, an outlet line which leads to a washing apparatus and a facility for passing in nitrogen is charged with 12,280 parts of toluylene diisocyanate (mixture of about 80% of 2,4-toluylene diisocyanate and about 20% of 2,6-toluylene diisocyanate). Nitrogen is passed in, and the cooler is switched on. 5,550.5 parts of 2-ethylhexanol are gradually added in the course of 5 hours, during which the temperature slowly rises to 50° C. While a temperature of 50° C. is maintained, a further 3,649.5 parts of 2-ethylhexanol are added in the course of 4 hours. The reaction mixture is maintained at 50° C. for 75 minutes, the cooler is then switched off, and 3.6 parts of dibutyltin dilaurate are added. The heater is switched on, and the reaction mixture is heated to 65.6° C. in the course of 45 minutes. 3,184 parts of 1,1,1-trimethylolpropane are added in the course of 2 hours and 50 minutes, during which the temperature risesfrom 65.6° to 120° C. The reaction mixture is maintained at this temperature for 90 minutes, when 10,560 parts of 2-ethoxyethanol are added. The resulting product is a soluzion of a polyurethane crosslinking agent.

INITIAL PRODUCT 5

Preparation of a polyfunctional crosslinking agent 2,340 g of glycidyl 2-methyl-1-ethylheptanoate are heated together with 2,073 g of trimellitic anhydride in a reaction vessel to 130° C. A highly exothermic reaction sets in during the heating-up phase. The reaction temperature is maintained at 150° C. by external cooling until an acid number of 183 has been reached. The mixture is then cooled down to 90° C., and 1,450 g of isobutyl methyl ketone are added. 835 g of propylene oxide are then slowly added dropwise. The reaction is terminated at an acid number <2. Further isobutyl methyl ketone is used to adjust the solids content of the resin solution to 70%.

INITIAL PRODUCT 6

Preparation of a milling binder and of a pigment paste

A reactor which is equipped with a heater, a cooler, a stirrer and a nitrogen inlet tube is charged with 1,948 g of bisphenol A diglycidyl ether and 817 parts of 2,2-dimethyl-3-hydroxypropyl 2,2-dimethyl-3-hydroxypropionate. The batch is then heated and the temperature maintained at 132° C. until an epoxide equivalent weight of 1,350 has been reached. 675 g of a 90% strength solution in isobutyl methyl ketone half-blocked diisocyanate formed from 2-ethylhexanol and toluylene diisocyanate are then added. 3,109 g of butyl glycol are then slowly added, and the mixture is cooled down to 80° C. In the meantime the following ammonium salt is prepared: the reaction product of 89.9 parts of diethanolamine and 330.9 parts of a half-blocked diisocyanate formed from 2-ethylhexanol and toluylene diisocyanate (95% strength in isobutyl methyl ketone) is nuetralized with a mixture of 121.3 parts of 88% strength lactic acid and 95.7 parts of deionized water, in 40.4 parts of butylglycol. 884.1 g of this ammonium salt are added to the above batch. A further 220 g of butylglycol are then added, and the batch is maintained at 80° C. for 4 hours. The resin solution is then filtered.

A clear solution is then prepared from 224 g of resin solution, 419 g of deionized water and 3.2 g of dibutyltin oxide. The solution is milled in a mill to a Hegman fineness of 7, and the mill base is then filtered.

The pigment paste is made up from the following components: 387 g of the resin solution are mixed with 631 g of deionized water, 387 g of aluminum silicate, 68 g of lead silicate and 54.2 g of carbon black. The mixture is incipiently milled on a Cowles mill for 15 minutes. 34 g of strontium chromate are then added. The material is then milled in a mill to a Hegman fineness of 7. 55.5 g of the clear solution described above are then admixed. The mixture is filtered and is used as a black pigment paste.

EXAMPLE 1

A reactor which is equipped with a heater, a stirrer, a thermometer, a cooler and a nitrogen inlet tube is charged with 998 parts of a commercially available epoxy resin based on bisphenol A and having an epoxide equivalent weight of 188, 212 parts of 2-ethyl-2-butylpropane-1,3-diol and 5.4 parts of dimethylbenzylamine. The temperature is raised to 132° C., and the reaczion is carried out until an epoxide equivalent weight of 440 has been reached. 90 parts of xylene, 3 parts of 2,6-di-tert.-butyl-p-cresol, 705 parts of initial product 1, described above, and 5 parts of tributylphosphine are then added. The exothermic reaction is kept by cooling at 85° C. until an epoxide equivalent weight of 1,170 has been reached. 33% by weight, relative to the solids content, of the crosslinking agent solution described above as initial product 4 are then added. 99 parts of a reaction product of diethylenetriamine and isobutyl methyl ketone, as a 70% strength solution in isobutyl methyl ketone and 78 parts of methylethanolamine are added. After 1 hour 166 parts of phenylglycol are added and mixed in for 15 minutes. In the meantime a dispersing bath has been prepared in 1,964 parts of deionized water from 36 parts of glacial acetic acid and 62 parts of a commercially available emulsifier solution. The resin solution is stirred into this bath. After 90 minutes a further 1,478 parts of deionized water are added and mixed in for 30 minutes.

EXAMPLE 2

A 4 l reaction vessel which is equipped with a heater, a stirrer, a thermometer, a cooler and a nitrogen inlet tube is charged with 1,290 parts of a commercially available epoxy resin based on bisphenol A and having an epoxide equivalent weight of 188, 350 parts of neopentylglycol hydroxypivalate, 82 parts of xylene and 6 parts of dimethylbenzylamine. The temperature is raised to 135° C., and the reaction is carried out until an epoxide equivalent weight of 460 has been reached. 2 parts of 2,6-di-terto-butyl-p-cresol and 428 parts of initial product 1, described above, are then added. The reaction is carried out at 135° C. until an epoxide equivalent weight of 1,180 has been reached. 247 parts of 2-ethylhexanoic acid are then added. When epoxy groups are no longer detectable 162 parts of phenylglycol are added, and the mixture is cooled down to 60° C. 134 parts of diethanolamine are then added, and a Michael addition is carried out on to the double bonds.

In the meantime a dispersing bath is prepared from 2,424 parts of deionized water, 51 parts of glacial acetic acid and 37 parts of a commercially available emulsifier mixture. The resin solution is dispersed in this dispersing bath. After 90 minutes a further 1,793 parts of deionized water are added and mixed in for 30 minutes.

EXAMPLE 3

A reaction vessel is charged with 1,161 parts of a commercially available epoxy resin based on bisphenol A (epoxide equivalent weight 188), 204 parts of dimethylmalonic acid, 82 parts of xylene and 3 parts of dimethylbenzylamine. The temperature is raised to 145° C., and the reaction is carried out until an epoxide equivalent weight of 420 has been reached. 378 parts of initial product 3 and 1.5 parts of 2,6-di-tert.-butyl-p-cresol are then added, and the reaction is continued at 115° C. until an epoxide equivalent weight of 1,100 has been reached. 375 parts of the reaction product of methylaminopropylamine and isobutyl methyl ketone, as a 70% strength solution in isobutyl methyl ketone, are then added. After one hour 834 parts of the crosslinking agent solution described as in initial product 5 are added and mixed in for 15 minutes. 207 parts of hexylglycol are then added and mixed in for 15 minutes.

In the meantime a dispersing bath is prepared from 2,141 parts of deionized water, 52 parts of a commercially available emulsifier mixture and 62 parts of glacial acetic acid. The resin solution is dispersed in this dispersing bath. After one hour a further 1,490 parts of water are added and mixed in for 15 minutes. A further 1,633 parts of water are then added, and the dispersion is subjected to a vacuum distillation to remove interfering solvents. A total of 400 parts of aqueous and organic phase are distilled off. The dispersion then has a solids content of 35%.

EXAMPLE 4

A reaction vessel is charged with 1,279 parts of a commercially available epoxy resin based on bisphenol A (epoxide equivalent weight 188), 225 parts of thiodipropylene glycol, 99 parts of xylene and 4 parts of dimethylbenzylamine. The temperature is raised to 135° C., the reaction is carried out until an epoxide equivalent weight of 420 has been reached. 476 parts of initial product 2 and 2 parts of 2,6-di-tert.-butyl-p-cresol are then added. The reaction is continued until an epoxide equivalent weight of 1,150 has been reached. 265 parts of 3,3,5-trimethylhexanoic acid are then added. The reaction is continued at 135° C. until epoxy groups are no longer detectable and the acid number is <3. 196 parts of a commercially available mixture of diisobutyl esters are then added, the mixture is cooled down to 70° C., and 178 parts of diethanolamine are added. During this addition the temperature should not exceed 70° C.

In the meantime a dispersing bath has been prepared from 2,213 parts of deionized water, 37 parts of a commercially available emulsifier mixture and 102 parts of glacial acetic acid. The resin solution is dispersed in this dispersing bath. After one hour a further 1,895 parts of deionized water are added to reduce the solids content to 35%. This quantity of water is mixed in for 15 minutes.

EXAMPLE 5

A reaction vessel is charged with 1,440 parts of a commercially available epoxy resin based on bisphenol A (epoxide equivalent weight 188), 199 parts of neopentylglycol, 81 parts of xylene and 6 parts of dimethylbenzylamine. The temperature is raised to 133° C., the reaction is carried out until an epoxide equivalent weight of 400 has been reached. 536 parts of initial product 2 and 2 parts 2,6-di-tert.-butyl-p-cresol are then added, and the reaction is continued until an epoxide equivalent weight of 1,100 has been reached. 144 parts of the reaction product of diethylenetriamine and isobutyl methyl ketone, as a 70% strength solution in isobutyl methyl ketone, and 115 parts of methylethanolamine are then added rapidly in succession. For this purpose the temperature has been reduced to 115° C., and the reaction is completed at this temperature in the course of one hour. 193 parts of 2,2,4-trimethylpentane-1,3-diol are then added and mixed in for 15 minutes. In the meantime a dispersing bath has been prepared from 2,157 parts of deionized water, 52 parts of a commercially available emulsifier mixture and 57 parts of glacial acetic acid. The resin solution is dispersed in this dispersing bath. After one hour a further 1,819 parts of deionized water are added and mixed in for 15 minutes. The dispersion has a solids content of 37%.

PREPARATION OF DEPOSITION BATHS

The deposition baths are prepared by combining the resin dispersions with the pigment paste described above and a further amount of deionized water and acetic acid, according to the following recipe:

2,100 parts of resin dispersion
710 parts of pigment paste
25 parts of 10% strength acetic acid
2,165 parts of deionized water The paint films are deposited at a bath temperature of 27° C. in the course of 2 minutes on to a phosphated panel connected as the cathode. The deposited films are rinsed with water, and blown dry with compressed air. The films are then baked in a through-circulation furnace.

The deposition results are summarized in the table below.

|  | Deposition results | | | | |
| --- | --- | --- | --- | --- | --- |
|  | Example 1 | Example 2 | Example 3 | Example 4 | Example 5 |
| Deposition voltage (V) | 270 | 280 | 350 | 310 | 280 |
| Baking temperature (°C.) | 180 | 185 | 180 | 185 | 185 |
| Baking time (min.) | 20 | 15 | 15 | 20 | 20 |
| Film thickness (μm) | 43 | 47 | 33 | 38 | 37 |
| Flow | 1 | 2 | 1 | 1 | 1 |
| MIK resistance | ok | ok | ok | ok | ok |
| Cross hatch (DIN 53,151) | 0 | 0 | 0 | 0 | 0 |

MIK = isobutyl methyl ketone
ok = to specification

We claim:

1. A water-dispersible binder for cationic electropaints based on reaction products which are formed from modified epoxy resins and primary amines, secondary amines, or mixtures thereof, comprising:
   (I) a first reaction product having terminal epoxy groups containing 10-45% of aromatic groups, calculated as the phenylene groups from:
   (A) low molecular weight epoxy resins containing aromatic groups and having an epoxide equivalent weight of below 375; and
   (B) a first polyfunctional compound having a molecular weight below 350 selected from the group consisting of polyfunctional alcohols and carboxylic acids, said polyfunctional alcohols selected from the group consisting of aliphatic polyfunctional alcohols and alicyclic polyfunctional alcohols;
   (II) a second reaction product and chain lengthened product of the terminal epoxy groups of (I) and:
   (C) phenolic hydroxyl groups of a mononuclear or polynuclear phenol which has at least two of said phenolic hydroxyl groups and at least one α-β-olefinically unsaturated amidomethyl group of the following formula

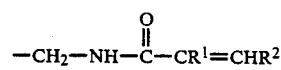

as a substituent on the aromatic ring(s) and in which $R^1$ and $R^2$ are identical to or different from one another and represent hydrogen or a methyl group, and
   (III) a third reaction product of II and:

(D) an amine compound selected from the group consisting of primary amines, secondary amines, and an ammonium salt.

2. The binder of claim 1, further comprising cross-linking agents, pigments, and flow control agents.

3. The binder of claim 2, wherein said second reaction product is reacted in a molar ratio to produce said resulting second reaction product having terminal epoxy groups and the amine compound of (D) is added to these epoxy groups.

4. The binder of claim 3, wherein said terminal epoxy groups have been opened up by reacting them with a compound selected from the group consisting of carboxylic acid, an alcohol, a thio alcohol, and a phenol.

5. The binder of claim 4, wherein component (C) is a mononuclear or binuclear phenol of the following formula

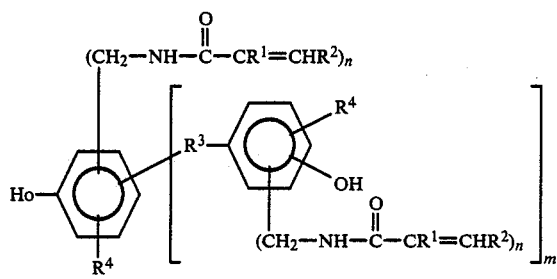

in which $R^1$ and $R^2$ are identical to or different from one another, and represent hydrogen or a methyl group, $R^3$ represents a straight-chain or branched divalent alkylene radical or represents —$SO_2$—, —SO—, —S—, —CO—, or —O—, $R^4$ represents hygrogen, a hydroxyl group or an alkyl radical, n=1 to 3, and m=0 or 1.

6. The binder of claim 5, wherein component (A) is an epoxy resin based on bisphenol A.

7. The binder of claim 5, wherein component (A) is a polyglycidal ester.

8. The binder of claim 5, wherein component (B) is a diol or a dicarboxylic acid having a branched aliphatic chain.

9. The binder of claim 5, wherein component (B) is a diol or a dicarboxylic acid having at least one neo structure.

10. The binder of claim 5, wherein component (C) is 10–50% by weight, relative to the total binder.

11. The binder of claim 5, wherein some of the hydroxyl groups have been reacted with a partially blocked polyisocyanate which on average contains one free isocyanate group per molecule and whose blocked isocyanate groups are stable at room temperature.

12. A process for preparing a binder for cationic electropaints based on reaction products formed from modified epoxy resins and amines comprising reacting:
(A) low molecular weight epoxide resins containing aromatic groups and having an epoxide equivalent weight of below 375; and
(B) a first polyfunctional compound having a molecular weight below 350 selected from the group consisting of polyfunctional alcohols and carboxylic acids, said polyfunctional alcohols selected from the group consisting of aliphatic polyfunctional alcohols and alicyclic polyfunctional alcohols to form
(I) a first reaction product having terminal epoxy groups containing 10–45% of aromatic groups, calculated as the phenylene groups and reacting the terminal epoxy groups of said first reaction product with
(C) phenolic hydroxyl groups of a mononuclear or polynuclear phenol which has at least two of said phenolic hydroxyl groups and at least one α-β-olefinically unsaturated amidomethyl group of the following formula

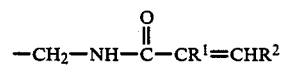

as a substituent on the aromatic ring(s) and in which $R^1$ and $R^2$ are identical to or different from one another and represent hydrogen or a methyl group to form
(II) a second reaction product and chain lengthened product and reacting said second reaction product with
(D) an amine compound selected from the group consisting of primary amines, secondary amines, and an ammonium salt to form
(III) a third reaction product.

13. The process of claim 12, further comprising the addition of cross-linking agents, pigments, and flow control agents.

14. The process of claim 12, wherein said terminal epoxy groups are opened up by reacting them with a carboxylic acid, an alcohol, a thio alcohol, or a phenol.

15. The process of claim 12, wherein component (C) is a mononuclear or binuclear phenol of the following formula:

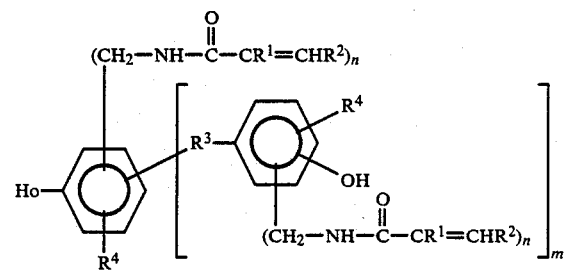

in which $R^1$ and $R^2$ are identical to or different from one another and represent hydrogen or a methyl group, $R^3$ represents a staight-chain or branched divalent alkylene radical or represents —$SO_2$—, —SO—, —S—, —CO—, or —O—, $R^4$ represents hydrogen, a hydroxyl group or an alkyl radical, n=1 to 3, and m=0 or 1.

16. The process of claim 15, wherein component (A) is an epoxy resin based on bispphenol A.

17. The process of claim 15, wherein component (A) is an epoxy resin based of polyglycidyl esters.

18. The process of claim 12, wherein said second reaction product of (A) and (B) with (C) is reacted in a molar ratio to produce said second reaction product having terminal epoxy groups and said amine compound (D) is added these epoxy groups.

19. The process of claim 15, wherein component (B) is a diol or dicarboxylic acid having a branched aliphatic chain.

20. The process of claim 15, wherein component (B) is a diol or dicarboxylic acid having at least one neo structure.

21. The process of claim 15, wherein component (C) is 10–50% by weight, relative to the total binder.

22. The process of claim 15, wherein some of the hydroxyl groups of the reaction product of components (A), (B), (C) and (D) are reacted with a partially blocked isocyanate which on average contains one free isocyanate group per molecule and whose blocked isocyanate groups are stable at room temperature.

23. A process for the electrophoretic coating of an electrically conductive substrate which is connected as the cathode, from an aqueous bath based on cationic binders at least partially neutralized with acids, wherein the binders have been prepared by reacting:
(A) low molecular weight epoxide resins containing aromatic groups and having an epoxide equivalent weight of below 375; and
(B) a first polyfunctional compound having a molecular weight below 350 selected from the group consisting of polyfunctional alcohols and carboxylic acids, said polyfunctional alcohols selected from the group consisting of aliphatic polyfunctional alcohols and alicyclic polyfunctional alcohols to form
(I) a first reaction product having terminal epoxy groups containing 10–45% of aromatic groups, and reacting said terminal epoxy groups with
(C) phenolic hydroxyl groups of a mononuclear or polynuclear phenol which has at least two of said phenolic hydroxyl groups and at least one α-β-olefinically unsaturated amidomethyl group of the following formula

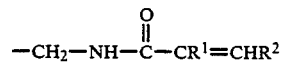

as a substituent on the aromatic ring(S) and in which $R^1$ and $R^2$ are identical to or different from one another and represent hydrogen or a methyl group, to form
(II) a second reaction product and chain lengthened product, and reacting said second reaction product (II) with
(D) an amine compound selected from the group consisting of primary amines, secondary amines, and an ammonium salt to form
(III) a third reaction product.

24. The process of claim 23, wherein component (A) is an epoxy resin based on bisphenol A.

25. The process of claim 23, wherein component (A) is a polyglycidyl ester.

26. The process of claim 23, wherein component B is a diol or a dicarboxylic acid having a branched aliphatic chain.

27. The process of claim 23, wherein component (B) is a diol or a dicarboxylic acid having at least one neo structure.

28. The process of claim 23, wherein component (C) is 10–50% by weight, relative to the total binder.

29. A product obtained by the process of claim 23 having a film thickness on said substrate of 33 to 47 μm.

* * * * *